Patented Apr. 5, 1949

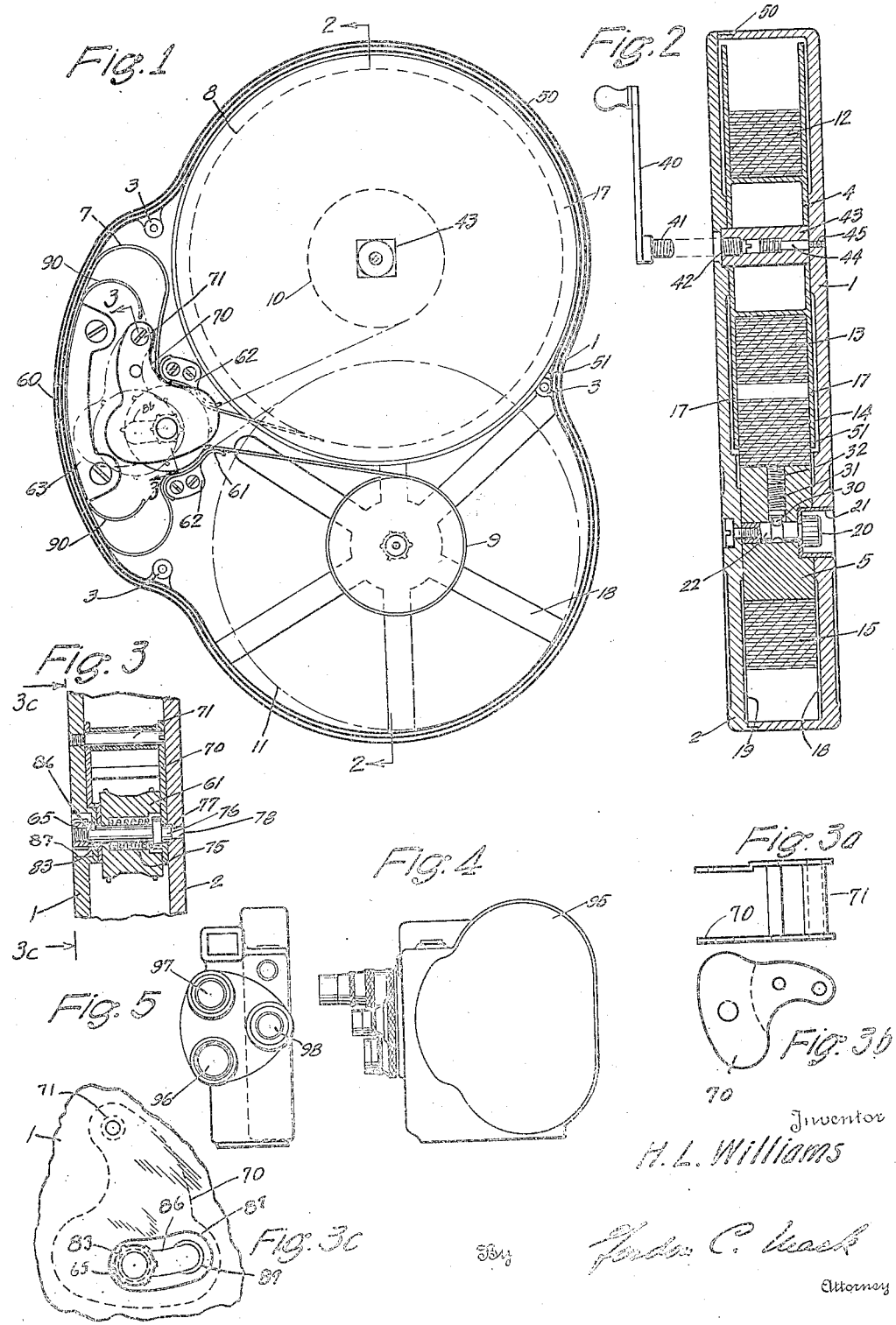

2,466,524

UNITED STATES PATENT OFFICE 2,466,524

FILM MAGAZINE

Herbert Lloyd Williams, Coconut Grove, Fla.

Application July 29, 1942, Serial No. 452,751

9 Claims. (Cl. 88—17)

This invention relates to a film magazine for a motion picture camera and includes various novel features.

The film magazines currently used and known in the past have been magazines designed to be opened only in the dark. It has been customary to provide two spools in a magazine and to transfer the film from one spool to the other as it is exposed.

The film magazine of this invention is more compact than the magazines of the prior art. It comprises a spindle or core without ends, and this is used in combination with a spool having light-excluding ends or flanges on which the unused film is charged into the magazine and to which the film is returned after exposure and before removing it from the magazine. By using a spindle in combination with a spool and having their centers close together, as explained below, the magazine may be made more compact than when two spools are employed.

In a preferred form of the invention, the sprocket in the magazine which draws the film from the spool and feeds it to the spindle, as it is being exposed, is mounted on a swing-out bracket. After the film has all been exposed the position of this bracket is changed. This disengages the teeth of the sprocket from the perforations in the film so that the film may be wound rapidly back on to the spool without danger of tearing the film with the sprocket teeth.

The invention includes various novel features which will be described in connection with the accompanying drawings. Although the invention is illustrated as applied to a single width film, it is equally applicable to double width film, i. e. film on which two exposures are made side by side. The film may be fifty feet or one hundred feet in length, or any desired length. The magazine may be designed to operate with film of different lengths, if desired.

In the drawings:

Fig. 1 is a view of the magazine with the cover removed;

Fig. 2 is a sectional view on the line 2—2 of Fig. 1 except that instead of having most of the film on the spool as in Fig. 1 the film is shown substantially evenly divided on the spool and on the spindle, and the magazine is shown with its cover on;

Fig. 3 is a detail on the line 3—3 of Fig. 1 showing the means employed for disengaging the sprocket when the film is wound back on to the spool;

Figs. 3a and 3b show different views of the swing-out bracket;

Fig. 3c is an enlarged detail of a part of the mechanism as viewed from the bottom of the magazine;

Fig. 4 is a side view of the camera on a small scale; and

Fig. 5 is a front view of the camera.

The body of the magazine is composed of a bottom portion 1 and a cover 2 which is held in place by screws (not shown) which fit into the spacer tubes 3 which are threaded near the bottom. The magazine comprises the spool 4 and the spindle or core 5. The axes of the spool and spindle are arranged so close together that when the spool is full of film it occupies a part of the same space that it occupies when the spindle is full of film. This will be explained by reference to Figs. 1 and 2.

In Fig. 1 the space occupied by the film 7 when the spool is full is indicated by the circle 8. When the spool is full the spindle 5 is substantially empty as indicated by the single lap of film 9. This is the position of the film when the magazine is freshly charged with unexposed film. As the film is exposed it is taken from the spool and rolled on to the spindle. After exposure of all of the film, the end of the film fastened to the spool occupies the position indicated by the circle 10. The spindle is then full and the film occupies the space indicated by the dotted circle 11. It will be noted that the circle 11 overlaps the circle 8. Such overlapping is only possible with a spool when the spool is used in combination with a spindle. Such overlapping occurs when the distance between the axis of the spool and the axis of the spindle is less than the diameter of the flanges on the spool.

Fig. 2 illustrates the position of the film after one-half of its length has been exposed and transferred from the spool 4 to the spindle 5. The unexposed portion is illustrated by the two shaded areas 12 and 13. The exposed portion is illustrated by the shaded areas 14 and 15. It will be noted from this illustration that as the film builds up on the spindle it occupies the space between the flanges 17 of the spool originally occupied by the unusued film, and these flanges 17 serve to keep the edges of the film in perfect alignment as the film is wound on to the spindle. The ribs 18 are pressed or molded into the half of the magazine which contains the spindle, and keep the edges of the film in alignment with a minimum of friction as it is being wound on to the spindle.

The spindle is driven by the motor of the camera in the usual way by means of the sprocket 20 which is located in the thimble 21 in the bottom of the magazine. This sprocket is permanently fastened on to the shaft 22. A driving or a retarding friction, as the case may be, is maintained between the shaft 22 and the body 5 of the core by means of the ball 30 which is held in engagement against the shaft 22 by the spring 31 which in turn is held in position by the screw 32.

The flanges or ends 17 of the spool protect the film from exposure to light before the film is inserted in the magazine. After exposure, the film is wound back on to the spool and the spool ends therefore also protect the film from the light after it has been exposed and removed from the magazine. The film can not be removed from the magazine when rolled on to the spindle because the spindle has no flanges or ends to protect the film from the light, and the light would damage the film, at least at its edges. Therefore, in using the magazine of this invention the operator will equip himself with several magazines charged with spools of fresh film which are threaded through the gate as later explained, with one end attached to the spindle in the magazine and with a single turn of the fresh film on the spindle as illustrated in Fig. 1. He will insert one of these magazines in the camera and after the full length of this spool of film has been exposed the operator will remove the magazine from the camera and replace it by another magazine containing a spool full of unexposed film. This film will then be exposed, and the operation repeated as long as the operator has magazines containing fresh film. Subsequently, at the operator's leisure he will transfer the exposed film in each of the magazines back on to the spool. After the film has been returned to the spool he can open the magazine, fasten the outer end of the film to prevent the film from unrolling, and then remove the spool charged with the exposed film without danger of the film becoming damaged by the light. He can then replace the spool of exposed film with a spool of fresh film, thread the film through the gate and on to the spindle and then again close the magazine and it is then ready for further use.

To return the film from the spindle to the spool the operator uses the crank 40. This is provided with the thread stud 41 which fits into the threaded end 42 of the square shaft 43 of the spool 4. This shaft is held in the magazine by the bolt 44 which is screwed into the bottom of the magazine as illustrated at 45. After the film has been returned from the spindle to the spool the crank 40 is removed.

Details of the structure of the magazine box or case will now be referred to. The cover in the illustration is a slip cover and the step at the outer upper edge of the bottom of the magazine case provided to receive the cover is indicated by the numeral 50 in both Figs. 1 and 2. It will be noted from both Figs. 1 and 2 that the box of the magazine which contains the spool is recessed at 51 in both the cover and the bottom of the magazine to prevent friction between the magazine and the ends 17 of the spool as the spool is rotated.

In traveling from the spool to the spindle the film passes the exposure opening 60. It is driven by the sprocket 61 both before it passes the exposure opening and after it passes the exposure opening. The guides 62 on both sides of the sprocket hold the film against the sprocket and insure the meshing of the teeth of the sprocket with the perforations in the film. The guide 63 holds the film close to the exposure opening 60, as it passes it. The sprocket 61 is driven by the small driving sprocket 65 most clearly illustrated in Fig. 3. This sprocket is driven from the motor of the camera in any usual way and determines the speed at which the film is exposed.

When the magazine is to be loaded with fresh film the swing-out bracket (described below) is brought to the position shown in Fig. 1.

The outer end of the fresh film is then threaded over teeth on one side of the sprocket, between the guide 63 and the exposure opening 60 at the front of the magazine, and then over teeth on the other side of the sprocket, and then this end of the film is fastened on to the spindle in the usual way. The cover is then placed on the magazine and the magazine is inserted in the camera.

The film is fed from the spool, past the exposure opening at a uniform rate of speed by the rotation of the driving sprocket 65 (shown in Fig. 3 and indicated in dotted lines in Fig. 1). The film after being thus exposed is reeled on to the spindle which is turned by the sprocket 20 (shown in Fig. 2). In this way the fresh film is exposed and the whole of the film except the end is transferred from the spool to the spindle. This end is so fastened to the spool that it does not separate from the spool when the film has all been exposed.

After the film has been exposed it must be transferred back on to the spool before the magazine is opened. In order to do this the sprocket 61 is disengaged from the film by moving the swing-out bracket toward the exposure opening. The mechanism for accomplishing this is best explained by reference to Fig. 3.

The sprocket 61 is mounted in the swing-out bracket 70 which pivots around the shaft 71. In Fig. 1 the sprocket and swing-out bracket are illustrated in two positions. The dotted lines illustrate the position occupied by these members when the teeth of the sprocket are disengaged from the film as it is transferred from the spindle back to the spool.

In order to swing the bracket out to disengage the sprocket 61 from the film, the sprocket 65 (Fig. 3) is lifted against the tension of the spring 75. This lifts the base portion of the sprocket 65 out of the counter-bore 83 and the base 76 of this shaft out of the counter-bore 77. To facilitate this the opening 78 is provided in the cover of the magazine for the insertion of a pencil point or other small object to press against the end of this shaft until the sprocket 65 is grasped with the fingers. The shaft moves through the slot 86 in the bottom of the magazine as the swing-out bracket is moved from one position to the other.

On both sides and at each end of this slot 86 the bottom of the magazine is recessed at 87 to give clearance for movement of the sprocket 65 and provide space for the driving mechanism of the camera to engage the sprocket.

When the bracket has been swung to the extent permitted by the slot 86 the operator's grasp on the sprocket is released and the base of the sprocket is sprung into the counter-bore 89, and the bottom of the shaft is sprung into a counter-bore (not shown) in the cover of the magazine similar to the counter-bore 77. This holds the sprocket 61 out of contact with the film (shown in dotted lines in Fig. 1) while the film is wound back on to the spool. With the sprocket 61 in this position the spring guides 90, which are a continuation from each end of the guide 63, guide the film from the spindle, past the exposure-opening, back on to the spool.

The base portion of the swing-out bracket 70 is flared so that it will cover the hole 78 and slot 86 regardless of the position of the bracket. This prevents light from entering at these openings.

When the exposed film has all been returned to the spool, the spool is removed from the magazine. It is replaced by a spool of new film. The outer end of the new film is threaded past the exposure opening and fastened to the spindle. The perforations in the film are made to mesh with teeth on each side of the sprocket 61 as this sprocket is swung back into operating position.

It is to be understood that the magazine may be adapted for use in any usual type of motion picture camera. For the purpose of illustration Fig. 4 shows a camera with an enlarged portion 95 shaped to receive the magazine. Fig. 5 shows a front view of the camera with the usual three lenses, 96, 97 and 98. Magazines may be built to accommodate any desired length of film and the magazine may be easily adapted for use in cameras of different design.

I claim:

1. In a film magazine a swing-out bracket carrying a sprocket with teeth spaced to mesh with perforations in motion picture film carried in the magazine, the bracket being pivoted at one end and flared at the other to prevent the entrance of light through a slot through which the driving shaft of the sprocket passes as the bracket pivots.

2. A film magazine, a swing-out bracket pivoted to swing therein, a sprocket mounted on the bracket with teeth adapted to mesh with perforations in motion picture film, a driving shaft at the center of the sprocket with driving means at one end located outside the magazine, a slot through which said shaft passes whatever the position of the swing-out bracket, at each end of the slot a counter-bore on the outside of the magazine and corresponding counter-bores on the inside of the opposite cover of the magazine in which means on the shaft outside the magazine and the opposite end of the shaft respectively are adapted to fit, and a spring within the sprocket to seat said means and shaft therein when the shaft is at either end of the slot.

3. A film magazine with an exposure opening therein, a spindle permanently fastened therein and adapted to receive motion picture film, a spool with light-excluding flanges removably positioned in the magazine and adapted to hold motion picture film, the distance between the center of the spool and the center of the spindle being less than the diameter of the flange of the spool, a swing-out bracket pivoted at one end to the magazine and at the other end carrying a sprocket over which the film is adapted to pass in being fed in front of the exposure opening while being transferred from the spool to the spindle while the bracket is at one end of its swing, and which sprocket is out of contact with the film when the bracket is at the opposite end of its swing.

4. A film magazine provided with a sprocket with teeth spaced to mesh with perforations in motion picture film carried in the magazine, a spool with light-excluding flanges mounted in the magazine, a spindle on to which the film is wound from the spool and from which it is wound back on to the spindle, means for meshing the teeth of the sprocket with the film in passing in the one direction, means for keeping the teeth of the sprocket disengaged from the film while moving in the other direction, means designed for mechanical operation for moving the film in the one direction and means designed for manual operation for moving the film in the other direction and means to prevent separation of the film from the spool in this manner.

5. A film magazine equipped with a bracket which is adapted to swing on a pivot on which it is mounted, a sprocket mounted on the bracket, a spring-actuated plunger located axially of the sprocket and a recess in the inner surface of a wall of the magazine adapted to receive the plunger at one end of the bracket's swing, an exposure opening in the magazine and guides for guiding motion picture film from a supply source past the exposure opening to storage means, the pivot being so arranged that at one end of the bracket's swing the perforations in the portion of the film passing from the supply source to the exposure opening mesh with teeth on one portion of the sprocket while teeth on another portion of the sprocket simultaneously mesh with perforations in the portion of the film passing from the exposure opening to the storage means, and at the other end of the swing the teeth of the sprocket do not mesh with any perforations of the film.

6. A film magazine provided with a swing-out bracket carrying a sprocket with teeth spaced to mesh with perforations in motion picture film carried in the magazine, the bracket being pivoted to the magazine at a distance from the sprocket so that the bracket may be swung in one position to engage its teeth with perforations in the film and in another position so as to disengage its teeth from perforations in the film and spring-actuated locking means located axially of the sprocket for locking the sprocket at one end of its swing.

7. A film magazine with an exposure opening therein, a spindle permanently fastened therein and adapted to receive motion picture film, removably positioned in the magazine a spool with light-excluding flanges which is adapted to hold motion picture film, a swing-out bracket pivoted at one end to the magazine, and supported by the bracket at a distance from the pivot a sprocket over which the film is adapted to pass in being fed in front of the exposure opening while being transferred from the spool to the spindle while the bracket is at one end of its swing, the sprocket being out of contact with the film when the bracket is at the opposite end of its swing.

8. A film magazine with an exposure opening therein, a spindle permanently fastened therein and adapted to receive motion picture film, removably positioned in the magazine a spool with light-excluding flanges which is adapted to hold motion picture film, the axes of the spool and the spindle being closer together than the diameter of the flanges, a swing-out bracket pivoted at one end of the magazine, and supported by the bracket at a distance from the pivot, a sprocket over which the film is adapted to pass in being fed in front of the exposure opening while being transferred from the spool to the spindle while the bracket is at one end of its swing, the sprocket being out of contact with the film when the bracket is at the opposite end of the swing.

9. A film magazine with an exposure opening therein, a spindle permanently fastened therein and adapted to receive motion picture film, removably positioned in the magazine a spool with light-excluding flanges which is adapted to hold motion picture film, the axes of the spool and the spindle being closer together than the diameter of the flanges, film-guiding means narrower than the distance between the outside surfaces of the flanges which cooperate with the flanges to keep the edges of the film in alignment as the film is wound from the spool onto the spindle, a swing-out bracket pivoted at one end to the magazine, and supported by the bracket at a distance from the pivot, a sprocket over which the film is adapted to pass in being fed in front of the exposure opening while being transferred from the spool to the spindle while the bracket is at one end of its swing, the sprocket being out of contact with the film when the bracket is at the opposite end of the swing.

HERBERT LLOYD WILLIAMS.

REFERENCES CITED

The following references are of record in the file of this patent:

UNITED STATES PATENTS

| Number | Name | Date |
| --- | --- | --- |
| 1,315,650 | Akeley | Sept. 9, 1919 |
| 1,510,738 | Capstaff | Oct. 7, 1924 |
| 1,572,252 | Tessier | Feb. 9, 1926 |
| 1,638,569 | Fritts | Aug. 9, 1927 |
| 1,691,414 | Thornton | Nov. 13, 1928 |
| 1,747,656 | Ausloos et al. | Feb. 18, 1930 |
| 1,771,651 | Neuman | July 29, 1930 |
| 1,798,870 | Doorbar | Mar. 31, 1931 |
| 1,815,693 | DeMadaler | July 21, 1931 |
| 1,839,064 | Thornton | Dec. 29, 1931 |
| 1,871,234 | Proctor | Aug. 9, 1932 |
| 1,921,560 | Case | Aug. 8, 1933 |
| 1,944,023 | Ford | Jan. 16, 1934 |
| 1,944,036 | Proctor | Jan. 16, 1934 |
| 1,946,605 | Wittel | Feb. 13, 1934 |
| 1,984,111 | Bouveng | Dec. 11, 1934 |
| 1,994,586 | Mihalyi | Mar. 19, 1935 |
| 2,028,608 | Howell | Jan. 21, 1936 |
| 2,059,834 | Wittel | Nov. 3, 1936 |
| 2,091,508 | Howell | Aug. 31, 1937 |
| 2,113,182 | Scheibell | Apr. 5, 1938 |
| 2,143,756 | Bouveng et al. | Jan. 10, 1939 |
| 2,143,769 | Fairbanks | Jan. 10, 1939 |
| 2,175,538 | Morsback et al. | Oct. 10, 1939 |
| 2,180,064 | Nuchterlein | Nov. 14, 1939 |
| 2,326,654 | Jagust | Aug. 10, 1943 |
| 2,351,088 | Wilson et al. | June 13, 1944 |

FOREIGN PATENTS

| Number | Country | Date |
| --- | --- | --- |
| 274,528 | Great Britain | July 18, 1927 |
| 655,598 | France | Dec. 18, 1928 |
| 505,655 | Germany | Aug. 22, 1930 |
| 200,088 | Switzerland | Dec. 16, 1938 |

OTHER REFERENCES

Handbook of Photography by Henney & Dudley (copyright 1939 by the McGraw-Hill Book Co.), page 135 cited.